US007872626B2

(12) United States Patent
Sempel et al.

(10) Patent No.: US 7,872,626 B2

(45) Date of Patent: Jan. 18, 2011

(54) SYSTEM AND METHOD FOR DYNAMICALLY CALIBRATING DRIVER CIRCUITS IN A DISPLAY DEVICE

(75) Inventors: Adrianus Sempel, Waalre (NL); Pieter J. Snijder, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 926 days.

(21) Appl. No.: 10/563,847

(22) PCT Filed: Jun. 30, 2004

(86) PCT No.: PCT/IB2004/002170

§ 371 (c)(1),
(2), (4) Date: Jan. 5, 2006

(87) PCT Pub. No.: WO2005/004098

PCT Pub. Date: Jan. 13, 2005

(65) Prior Publication Data

US 2006/0191178 A1 Aug. 31, 2006

(30) Foreign Application Priority Data

Jul. 8, 2003 (GB) ................................ 0315929.0

(51) Int. Cl.
*G06F 3/038* (2006.01)
*G09G 3/36* (2006.01)

(52) U.S. Cl. ........................................................ 345/93

(58) Field of Classification Search .................. 345/93, 345/204

See application file for complete search history.

(56) References Cited

U.S. PATENT DOCUMENTS

| | | | | |
|---|---|---|---|---|
| 3,122,813 | A | 3/1964 | Demaison | |
| 4,085,270 | A | 4/1978 | Henschler et al. | |
| 4,962,375 | A | 10/1990 | Hirane et al. | |
| 5,309,151 | A | 5/1994 | Aoki | |
| 5,903,246 | A | 5/1999 | Dingwall | |
| 6,144,165 | A | 11/2000 | Liedenbaum | |
| 6,373,454 | B1 | 4/2002 | Knapp et al. | |
| 6,816,143 | B1 * | 11/2004 | Lambert | 345/93 |
| 7,259,739 | B2 * | 8/2007 | Yun et al. | 345/93 |
| 2003/0128199 | A1 | 7/2003 | Kimura | |
| 2004/0085270 | A1 * | 5/2004 | Kimura | 345/82 |

FOREIGN PATENT DOCUMENTS

| | | | |
|---|---|---|---|
| EP | 0717446 | A2 | 6/1996 |
| EP | 0852372 | A1 | 7/1998 |
| EP | 0923067 | A1 | 6/1999 |
| WO | 9965012 | A2 | 12/1999 |
| WO | 0195301 | A1 | 12/2001 |
| WO | 03038795 | A1 | 5/2003 |
| WO | 03038797 | A1 | 5/2003 |

* cited by examiner

*Primary Examiner*—Amr Awad
*Assistant Examiner*—Randal Willis

(57) ABSTRACT

A display device has an array of display elements (2) each driven by an input provided on a data conductor (6). These inputs are generated by data conductor addressing circuitry (9) which has a plurality of controllable driver circuits (32, 34,40), each for providing an input to an associated data conductor. The number of controllable driver circuits is at least one greater than the number required for providing data to all data conductors. A reference driver circuit (30) is used for calibrating at least one of the controllable driver circuits whilst the other controllable driver circuits provide inputs to the data conductors. This provides a reduction in the spread of driver circuit outputs by calibration of the driver circuits using a reference driver circuit.

17 Claims, 4 Drawing Sheets

SYSTEM AND METHOD FOR DYNAMICALLY CALIBRATING DRIVER CIRCUITS IN A DISPLAY DEVICE

This invention relates to display devices, particularly but not exclusively current-addressed display devices, for example electroluminescent display devices.

Matrix display devices employing electroluminescent, light-emitting, display elements are well known. The display elements may comprise organic thin film electroluminescent elements, for example using polymer materials, or else light emitting diodes (LEDs) using traditional III-V semiconductor compounds. Recent developments in organic electroluminescent materials, particularly polymer materials, have demonstrated their ability to be used practically for video display devices. These materials typically comprise one or more layers of a semiconducting conjugated polymer sandwiched between a pair of electrodes, one of which is transparent and the other of which is of a material suitable for injecting holes or electrons into the polymer layer.

The polymer material can be fabricated using a CVD process, or simply by a spin coating technique using a solution of a soluble conjugated polymer. Ink-jet printing may also be used. Organic electroluminescent materials exhibit diode-like I-V properties, so that they are capable of providing both a display function and a switching function, and can be used in passive type displays. Alternatively, these materials may be used for active matrix display devices, with each pixel comprising a display element and a switching device for controlling the current through the display element.

Display devices of this type have current-driven display elements, so that a conventional, analogue drive scheme involves supplying a controllable current to the display element. It is known to provide a current source transistor as part of the pixel configuration, with the gate voltage supplied to the current source transistor determining the current through the display element. A storage capacitor holds the gate voltage after the addressing phase.

FIG. 1 shows a known pixel circuit for an active matrix addressed electroluminescent display device. The display device comprises a panel having a row and column matrix array of regularly-spaced pixels, denoted by the blocks 1 and comprising electroluminescent display elements 2 together with associated switching means, located at the intersections between crossing sets of row (selection) and column (data) address conductors 4 and 6. Only a few pixels are shown in the Figure for simplicity. In practice, there may be several hundred rows and columns of pixels. The pixels 1 are addressed via the sets of row and column address conductors by a peripheral drive circuit comprising a row, scanning, driver circuit 8 and a column, data, driver circuit 9 connected to the ends of the respective sets of conductors.

The electroluminescent display element 2 comprises an organic light emitting diode, represented here as a diode element (LED) and comprising a pair of electrodes between which one or more active layers of organic electroluminescent material is sandwiched. The display elements of the array are carried together with the associated active matrix circuitry on one side of an insulating support. Either the cathodes or the anodes of the display elements are formed of transparent conductive material. In a backward emitting arrangement, the support is of transparent material such as glass and the electrodes of the display elements 2 closest to the substrate may consist of a transparent conductive material such as ITO so that light generated by the electroluminescent layer is transmitted through these electrodes and the support so as to be visible to a viewer at the other side of the support. Upward emitting arrangements are also known which do not require a transparent substrate.

The display elements are integrated into an active matrix, whereby each display element has an associated switching circuit which is operable to supply a drive current to the display element so as to maintain its light output for a significantly longer period than the row address period. Thus, for example, each display element circuit is loaded with an analogue (display data) drive signal once per field period in a respective row address period, which drive signal is stored and is effective to maintain a required drive current through the display element for a field period until the row of display elements concerned is next addressed.

An example of such an active matrix addressed electroluminescent display device is described in EP-A-0717446. In EP-A-0717446, each switching circuit comprises two TFTs (thin film transistors) and a storage capacitor. The anode of the display element is connected to the drain of a drive TFT and an addressing TFT is connected to the gate of the drive TFT which is connected also to one side of the storage capacitor. During a row address period, the addressing TFT is turned on by means of a row selection (gating) signal and a drive (data) signal is transferred via this TFT to the capacitor.

After the removal of the selection signal, the addressing TFT turns off and the voltage stored on the capacitor, constituting a gate voltage for the drive TFT, is responsible for operation of the drive TFT which is arranged to deliver electrical current to the display element. The gate of the addressing TFT is connected to a gate line (row conductor) common to all display elements in the same row and the source of the addressing TFT is connected to a source line (column data conductor) common to all display elements in the same column.

With this voltage-addressed arrangement, the drive current for the light-emitting diode display element is determined by a voltage applied to the gate of the second TFT. This current therefore depends strongly on the characteristics of that TFT. Variations in threshold voltage, mobility and dimensions of the TFT will produce unwanted variations in the display element current, and hence its light output. Such variations in the drive TFT associated with display elements over the area of the array, or between different arrays, due, for example, to manufacturing processes, lead to non-uniformity of light outputs from the display elements.

In order to address this issue, WO 99/65012 discloses a pixel circuit in which each switching circuit comprises a current mirror circuit which operates to sample and store a current drive signal, and to apply the sampled drive signal to an identical pixel drive transistor. This circuit improves the uniformity of the light output, by ensuring that the currents driving the display elements are not subject to the effects of variations in the characteristics of individual transistors supplying the currents. The matching of the current sampling transistor and the pixel drive transistor is assumed as they are formed over adjacent areas of the substrate, so that variations over the area of the substrate can be ignored.

An alternative current mirror circuit in which matching of the current sampling transistor and the drive transistor is not required is disclosed in WO 99/60511. In this circuit, a current mirror circuit is implemented in which the same transistor is used to both sense and later produce the required drive current for the display element. This allows all variations in transistor characteristics to be compensated.

In both of these circuits, an input current is sampled and converted into a gate voltage, which is stored. The input current is generated by a current source circuit which forms part of the column driver circuit 9 in FIG. 1. A current source circuit is provided for each column, as they are addressed simultaneously. One problem with these current-addressed display arrangements is the matching of the output characteristics of the current sources. Good current matching is needed for good pixel brightness uniformity. This becomes increasingly important as the number of columns increases. For active matrix displays, the preferred technologies—low temperature polysilicon or amorphous silicon—do not lend themselves to the production of uniform current source circuits.

Matching of the individual column driver circuits within the column driver circuit is also an issue for voltage-addressed display devices.

According to the present invention, there is provided a display device comprising:

a matrix array of display elements each driven by an input provided on a data conductor; and data conductor addressing circuitry for generating the inputs in response to input data, wherein the data conductor addressing circuitry comprises:

a plurality of controllable driver circuits, each for providing an input to an associated data conductor, wherein the number of controllable driver circuits is at least one greater than the number required for providing data to all data conductors; and a reference driver circuit, wherein the reference driver circuit is for calibrating at least one of the controllable driver circuits whilst the other controllable driver circuits provide inputs to the data conductors.

The invention provides a reduction in the spread of driver circuit outputs by calibration of the driver circuits using a reference driver circuit.

The device may comprise a matrix array of current-addressed display elements, each driven by an input current, and the driver circuits may then comprise current source circuits for providing an input current to the associated data conductor. The reference driver circuit then comprises a reference current source. In this case, the invention is for reducing spread in the output of current source circuits.

The number of driver circuits required for providing inputs to all data conductors may be equal to the number of data conductors. In other words, there is one driver circuit for each data conductor, and at least one additional driver circuit, so that one driver circuit can be calibrated while the others are in use.

Alternatively, the number of driver circuits required for providing inputs to all data conductors may be equal to a fraction of the number of data conductors. In this case, each driver circuit is for providing inputs to a group of data conductors in multiplexed manner.

As a further alternative, and when the driver circuits are current source circuits, the number of current source circuits required for providing currents to all data conductors can be equal to a multiple of the number of data conductors. In this case, the current for each data conductor can be provided by the summation of the outputs from a number of smaller current source circuits. This has the advantage of averaging the outputs.

In particular, the number of smaller current source circuits can be selected from a larger group, and the number is then formed from a different selection from the group at different times. This implements the averaging operation.

Thus, it will be seen that the invention can be applied to a variety of driving schemes, and essentially requires at least one additional driver circuit element to the number required by the addressing scheme being used, so that at least one driver circuit element can be calibrated whilst the others implement the addressing scheme.

The driver circuit (or circuits) being calibrated is preferably rotated in an incremental or other sequence.

The invention may be applied to an active matrix or passive addressed electroluminescent display device. In this case, the driver circuits are current source circuits.

However, the display may comprise a matrix array of voltage-addressed display elements, for example LCD display elements, each driven by an input voltage. In this case, the driver circuits comprise controllable voltage source circuits for providing an input voltage to the associated data conductor, and the reference driver circuit comprises a reference voltage source. The invention can be used for active matrix or passive matrix LCD displays.

Thus, it will be seen that the invention can be applied to many different display device types and to different addressing schemes, and in each case reduces non-uniformity between input signals for the different columns which are generated by the column driver circuitry.

The invention also provides a method of providing drive signals to the data conductors of a display device during a data addressing period, the display device comprising an array of display elements, the method comprising:

generating inputs to be provided to the data conductors in response to input data using a plurality of controllable driver circuits selected from a number of controllable driver circuits which is at least one greater than the number required for providing inputs to all data conductors;

simultaneously calibrating the remaining at least one further controllable driver circuit using a reference driver circuit, wherein a different driver circuit or circuits are calibrated during different data addressing periods.

Embodiments of display devices in accordance with the invention will now be described, by way of example, with reference to the accompanying drawings, in which:—

The Figures are merely schematic and have not been drawn to scale. The same reference numbers are used throughout the figures to denote the same or similar parts.

Figure 1:
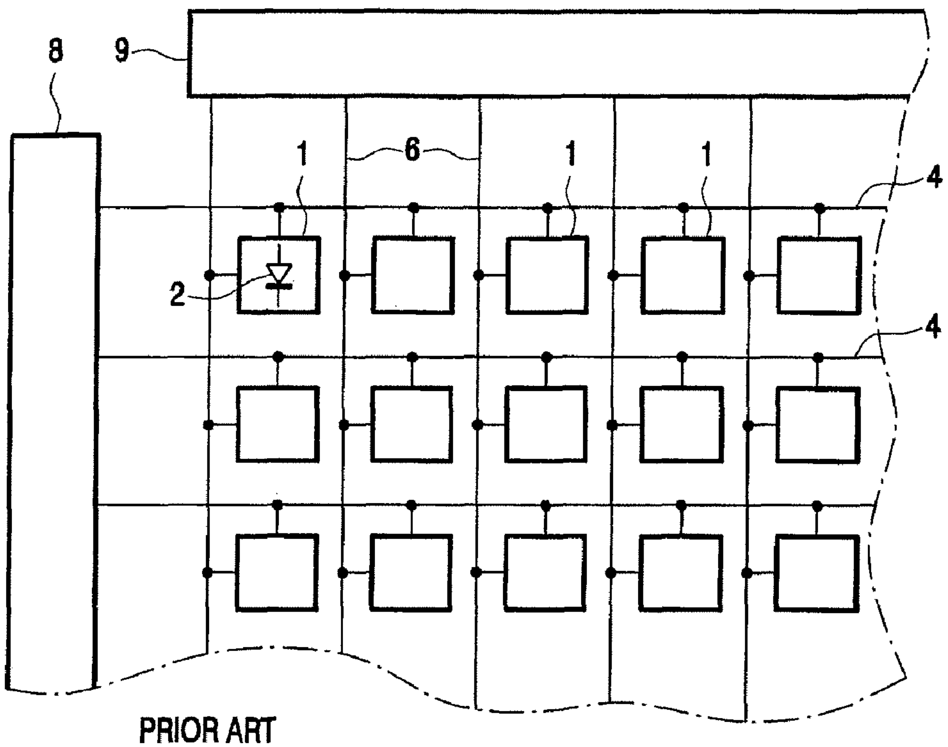
FIG. 1 shows a conventional active matrix LED display.
Figure 2:
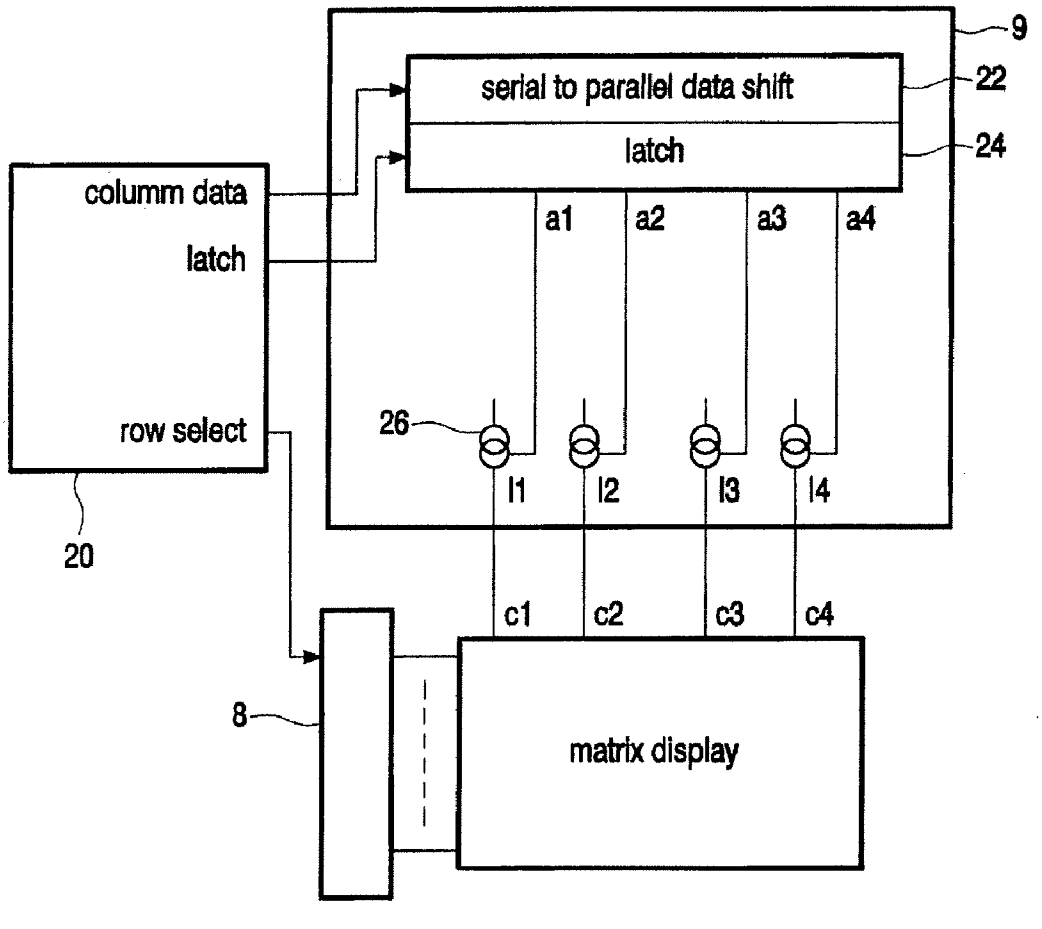
Fig.2 PRIOR ART
FIG. 2 shows how the currents are generated for a current-addressed LED display of the type shown in FIG. 1.

FIG. 2 is used to explain a conventional way to drive a current-addressed matrix display. A signal processor 20 provides the row address signals for controlling the row driver circuit 8 as well as the column data and timing signals for the column driver circuit 9.

The column driver circuit 9 has a serial to parallel shift register 22 which is loaded with the column data containing the pixel grey level information. This data may be amplitude modulation and/or or pulse width modulation information.

After latching in a latch circuit 24, the data signals a1-a4 control the current source circuits 26 which activate the pixels of the matrix display. Four columns are shown only for simplicity. The current value I1 is controlled by data signal a1 to drive the column c1 of the display. The row driver circuit 8 driven by a row select signal to control the row selection.

The current provided on the column c1 is sampled during a pixel programming phase, and the sampled current is then used to drive the pixel during the remainder of the field period. A number of different current sampling pixel configurations are known, and these will not be discussed in detail in this application.

In practical situations, the current sources I1-I4 show spread. This may originate for example from transistor threshold voltage mismatch, spread in mobility, layout aberrations and parasitic voltage drops across lines.

As a result, with equal data information on the lines a1-a4, the output currents available at columns c1-c4 show spread, which limits the pixel luminance uniformity of the display. At present, processing limitations result in minimum current spread of around 1%. As the light output of an OLED display depends linearly on the current level, pixel brightness spread of 1% results.

In order to obtain improved pixel brightness matching, for example of 0.2%, the current matching must clearly also be 0.2%. This cannot at present be achieved in standard IC technology without complicated trimming or automatic adjustment control. Furthermore, if current drivers from different chips are to be combined to drive large displays, the chip-to-chip matching also has to be within 0.2%, which again cannot easily be achieved.

The current matching problem affects passive as well as active matrix displays. In passive driven displays, the currents are used to activate directly the display pixels whereas in active driven displays the currents are used to control local pixel electronics. In the latter case, the pixel circuitry typically uses transistor technologies with poor matching properties such as low temperature polysilicon or amorphous silicon. It is advantageous to have the current source circuits 26 in the same technology, so that the column driver circuit (or a part of it) can be integrated onto the same substrate as the array of display pixels. In this way, the amount of interconnections to the input signal processor 20 is reduced considerably.

Consequently, the current matching of the current source I1-I4 is poor resulting in poor pixel uniformity and causing bright/dark columns in the display.

Figure 3:
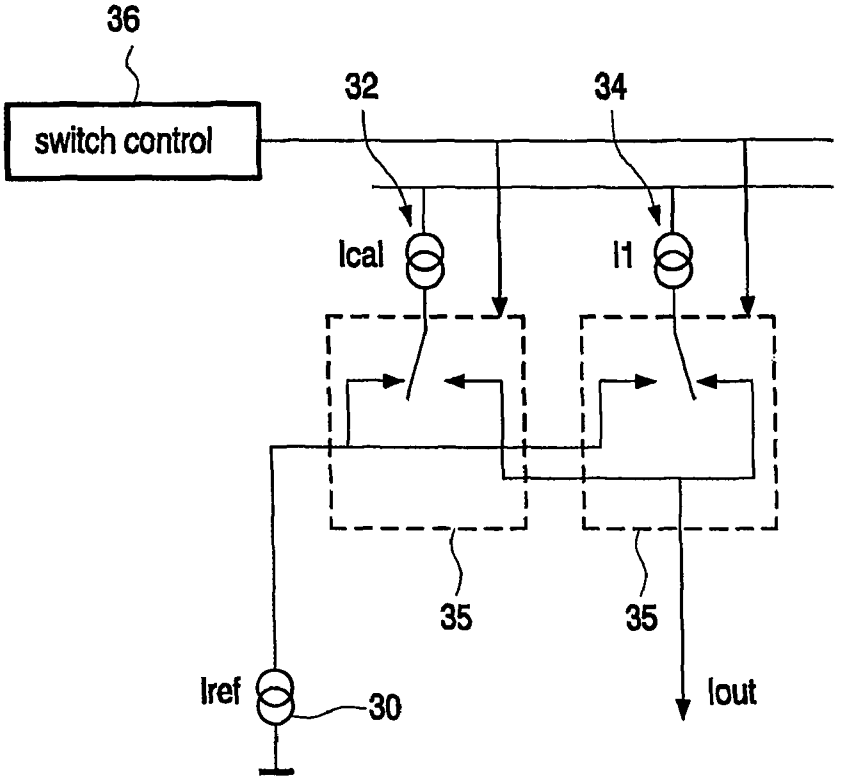
FIG. 3 is used to explain the calibration method of the invention.

FIG. 3 is used to explain the invention, which provides improved uniformity by calibration of the current sources.

In a preferred use of the invention, it can be applied to any display device having a matrix array of current-addressed display elements in which input currents are provided to the matrix array from a plurality of controllable current source circuits. The invention then requires at least one additional current source to be provided and a reference current source is used to calibrate at least one of the controllable current sources whilst the other controllable current sources provide currents to the matrix array. A reduction in the spread of the current source outputs is thus provided by calibration of the current source circuits using a single reference current source (or a single reference current source per driver chip).

In FIG. 3, a constant reference current source 30 (Iref) is provided which acts as the master current. For simplicity, FIG. 3 considers the simplified case of only one output lout. Two controllable current source circuits 32, 34 are provided, and each current source circuit includes a switching block 35 which enables the output to be connected selectively to the constant current source 30 or to the output. Each switching block has a control input from a switch control circuit 36.

During a first time period a first current source 32 (Ical) is adjusted to draw exactly the same current (Iref) as the reference current source 30. The current sources 32, 34 can be implemented as switched current mirror circuits to enable calibration.

During this period, the current source 34 delivers the output current (Iout) to activate the pixel in the single column.

In a second time period, the two current sources are interchanged, and while current source 34 is being calibrated, the current source 32 delivers the output current. This is achieved through control of the switching blocks 35. As this current source 32 was calibrated using the reference current source 30, the output current is accurate.

The calibration and driving operations are interchanged during successive addressing periods. In this way, the output current is regularly updated and calibrated to the reference current source 30.

This scheme can be expanded so that each current source has an associated calibration current source. Such a scheme would require an additional number of current sources corresponding to the number required for conventional addressing of the matrix array, in order to avoid time periods that no current source is available to deliver the output current.

Figure 4:
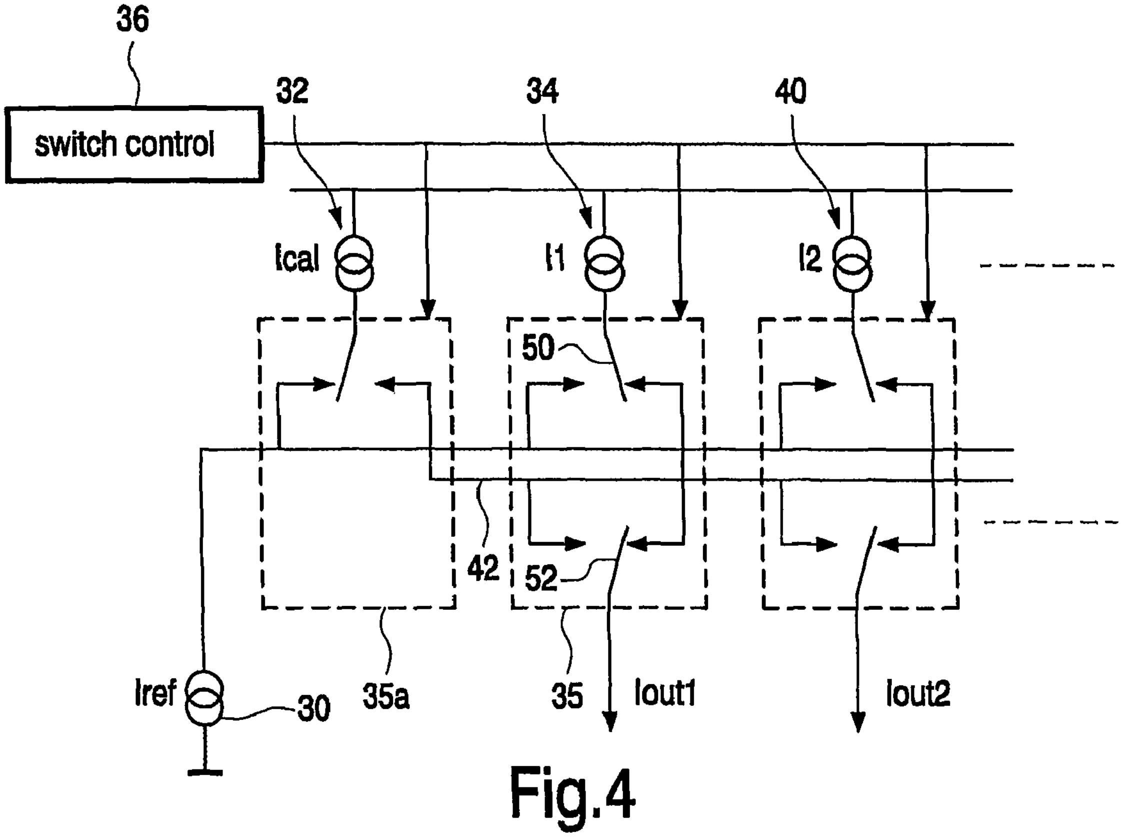
FIG. 4 is used to explain in greater detail the calibration method of the invention.

This overhead is reduced when a large number of current sources is calibrated using rotation of the calibration, as shown in FIG. 4.

The current sources 32, 34, 40 . . . are again each associated with a switching block 35. The switching block 35*a* for the first current source 32 allows the output to be connected either to the reference current source 30 or to a bus 42 which passes through the switching blocks 35 of all of the other switching blocks. Thus, the current source 32 is either being calibrated or is taking the place of one of the other current sources.

The switching block 35 for each other current source 34, 40, . . . . allows the output to be connected either to the reference current source or to an output switch. Thus, each of these switching blocks has two switches 50, 52. The output switch 52 either couples the current source output to the column or else couples the output from the first current source 32 from the bus 42 to the column.

During a first time period the first current source circuit 32 is calibrated. After this period, this current source 32 is available to temporarily replace one at a time the other current sources 34, 40, . . . while each of these is sequentially being calibrated by the reference current source 30.

Figure 5:
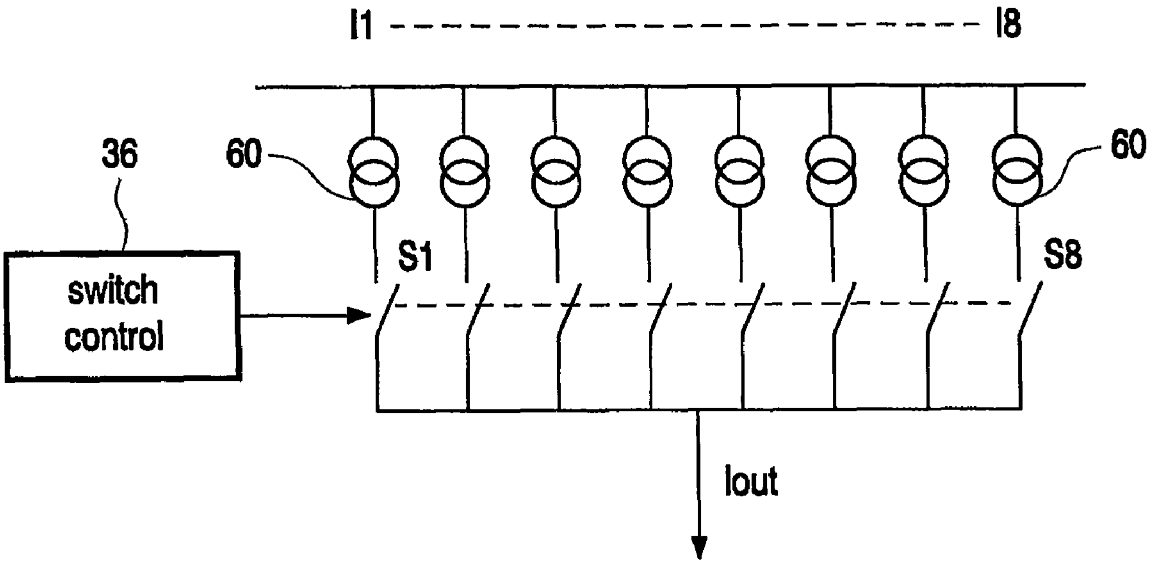
FIG. 5 is used to explain how the invention can combine an averaging method with a calibration method.

The invention can be enhanced by using an averaging technique, as shown in FIG. 5.

A number of small current sources 60 are interconnected in parallel to form a larger current source to deliver the output current lout. Averaging is carried out in two ways. Firstly, an averaging is obtained by the combination of a number of current sources. Secondly, by sequential rotation of these current sources, an averaging is obtained over all sources involved in the rotation.

For example, during a first period the sources I1, I2, I3 and I4 are combined to deliver the output current lout. During a second period the sources I1, I2, I3, I5 are combined. During a third period the sources I1, I2, I3, I6 are combined, and so on. In this way all combinations can be scanned. Unused current sources can be used to form other combinations at that time period to deliver other output currents at the same time. In this way no "extra" current sources are needed.

The calibration of each of these current sources 60 is carried out in sequence using an additional current source as described above.

This switched interchanging operation is also advantageous when implemented across current sources of different driver chips to reduce chip-to-chip spread. Another way of using this idea is to provide each chip with an associated reference current source and to regularly interchange the reference current reference source of each chip.

The invention can be used in both passive and active driven matrix displays, and compensates for poor initial transistor matching of the drivers. Also, field emission display drivers can advantageously use the idea to reduce driver mismatch and improve display uniformity. The invention improves the matching of current sources completely within the electrical domain.

Although the above embodiments have been described with reference to organic electroluminescent display elements in particular, it will be appreciated that other kinds of electroluminescent display elements comprising electroluminescent material through which current is passed to generate light output may be used instead.

In the examples above, the reference current source is described as "constant". The reference current source could instead be modulated over time, for example to control the overall display brightness, in response to sensor or user input.

In the detailed examples above, the invention is used in a current-addressed display. The invention can also be used within a voltage-addressed display such as a liquid crystal display. In this case, the column address circuitry includes voltage driver circuitry for each column, and the invention then provides calibration of the voltage driver circuitry for each column in sequence.

The invention can thus be applied to passive matrix or active matrix EL displays as well as to passive matrix or active matrix LCD displays.

The display device may be a monochrome or multi-colour display device.

From reading the present disclosure, other modifications will be apparent to persons skilled in the art. Such modifications may involve other features which are already known in the field of matrix electroluminescent displays and component parts thereof and which may be used instead of or in addition to features already described herein.

The invention claimed is:

1. A display device comprising:

a matrix array of display elements each driven by an input provided on a data conductor; and data conductor addressing circuitry for generating the inputs in response to input data, wherein the data conductor addressing circuitry comprises:

a plurality of controllable driver circuits, each for providing an input to an associated data conductor, a number of the driver circuits required for providing data to all the data conductors being dependent on the number of data conductors and the connection arrangement between the driver circuits and the data conductors, wherein the number of controllable driver circuits is at least one greater than the number of driver circuits required for providing data to all data conductors; and a reference driver circuit, outputting a constant reference current that does not change in response to said input data, wherein the reference driver circuit is for dynamically calibrating at least one of the controllable driver circuits whilst the other controllable driver circuits provide inputs to the data conductors, wherein each of said plurality of controllable driver circuits includes a switching block which enables the output of each of said plurality of controllable driver circuits to be connected selectively to the reference driver circuit during a first addressing period to perform a calibration operation and to a respective output of the display device in a further addressing period to perform a driving operation, and wherein the calibration and driving operations for each of said plurality of controllable driver circuits are interchanged during successive addressing periods.

2. A device as claimed in claim 1, comprising a matrix array of current-addressed display elements, each driven by an input current, and wherein the driver circuits comprise current source circuits for providing an input current to the associated data conductor, and the reference driver circuit comprises a reference current source.

3. A device as claimed in claim 2, wherein each display element is provided with an associated switching circuit for sampling the input current and subsequently providing the sampled input current to the display element.

4. A device as claimed in claim 2, wherein the number of current source circuits required for providing currents to all data conductors is equal to a multiple of the number of data conductors, and wherein the current for each data conductor is provided by the multiple number of current source circuits.

5. A device as claimed in claim 4, wherein the multiple number of current source circuits providing current to an associated data conductor is selected from a group (I1-I8) having a larger number of current source circuits, and the multiple number is formed from a different selection from the group at different times.

6. A device as claimed in claim 3, comprising an active matrix electroluminescent display device.

7. A device as claimed in claim 1, comprising a matrix array of voltage-addressed display elements, each driven by an input voltage, and wherein the driver circuits comprise voltage source circuits for providing an input voltage to the associated data conductor, and the reference driver circuit comprises a reference voltage source.

8. A device as claimed in claim 1, wherein the number of driver circuits required for providing inputs to all data conductors is equal to the number of data conductors.

9. A device as claimed in claim 1, wherein the number of driver circuits required for providing inputs to all data conductors is equal to a fraction of the number of data conductors, and wherein each driver circuit is for providing inputs to a group of data conductors in multiplexed manner.

10. A device as claimed in claim 1, wherein the reference driver circuit is for dynamically calibrating each of the controllable driver circuits in a sequence, and wherein the controllable driver circuits not being calibrated together provide the inputs to all data conductors.

11. A method of providing drive signals to the data conductors of a display device during a data addressing period, the display device comprising an array of display elements each driven by an input provided on a data conductor, the method comprising:

generating inputs from a plurality of controllable driver circuits to an associated plurality of data conductors, a number of the driver circuits required for providing data to all the data conductors being dependent on the number of data conductors and the connection arrangement between the driver circuits and the data conductors, wherein the number of controllable driver circuits is at least one greater than the number of controllable driver circuits required for providing data to all data conductors;

simultaneously dynamically calibrating at least one controllable driver circuit using a reference driver circuit that outputs a constant reference current that does not change in response to input data received from said plurality of controllable driver circuits whilst the other controllable driver circuits provide inputs to the data conductors, wherein each of said plurality of controllable driver circuits includes a switching block which enables the output of each of said plurality of controllable driver circuits to be connected selectively to the reference driver circuit during a first addressing period to perform a calibration operation and to a respective output of the display device in a further addressing period to perform a driving operation, and wherein the calibration and driving operations for each of said plurality of controllable driver circuits are interchanged during successive addressing periods.

12. A method as claimed in claim 11 for providing current drive signals to the data conductors, the display device comprising an array of current-addressed display elements, the controllable driver circuits comprising controllable current source circuits and the reference driver circuit comprising a reference current source, and wherein the method comprises generating input currents in response to the input data.

13. A method as claimed in claim 12, wherein a plurality of current source circuits is used to provide the input current to each data conductor.

14. A method as claimed in claim 13, wherein the plurality of current source circuits providing the input current to each data conductor is selected from a group having a larger number of current source circuits, and the plurality is formed from a different selection from the group at different times.

15. A method as claimed in claim 11, wherein one driver circuit is used to provide the input to each data conductor.

16. A method as claimed in claim 11, wherein one driver circuit is used to provide the input to a group of data conductors in multiplexed manner.

17. A method as claimed in claim 11, wherein the reference driver circuit is used to calibrate each of the controllable driver circuits in a sequence, and wherein the controllable driver circuits not being calibrated together provide the inputs to all data conductors.

* * * * *